US008855206B2

(12) United States Patent
Pateux et al.

(10) Patent No.: US 8,855,206 B2
(45) Date of Patent: Oct. 7, 2014

(54) METHOD AND DEVICE FOR ENCODING A SEQUENCE OF IMAGES IMPLEMENTING A TEMPORAL PREDICTION, CORRESPONDING SIGNAL, DATA STORAGE MEDIUM, METHOD AND DECODING DEVICE AND COMPUTER PROGRAM PRODUCTS

(75) Inventors: Stéphane Pateux, Rennes (FR); Isabelle Amonou, Cesson Sevine (FR); Nathalie Cammas, Sens de Bretagne (FR); Sylvain Kervadec, Sens de Bretagne (FR)

(73) Assignee: France Telecom, Paris (FR)

( * ) Notice: Subject to any disclaimer, the term of this patent is extended or adjusted under 35 U.S.C. 154(b) by 527 days.

(21) Appl. No.: 13/002,422

(22) PCT Filed: Jun. 30, 2009

(86) PCT No.: PCT/FR2009/051264
§ 371 (c)(1),
(2), (4) Date: Jan. 3, 2011

(87) PCT Pub. No.: WO2010/001050
PCT Pub. Date: Jan. 7, 2010

(65) Prior Publication Data
US 2011/0103487 A1    May 5, 2011

(30) Foreign Application Priority Data

Jul. 1, 2008  (FR) ...................... 08 54465

(51) Int. Cl.
| H04N 7/12 | (2006.01) |
| H04N 19/537 | (2014.01) |
| H04N 19/189 | (2014.01) |
| H04N 19/543 | (2014.01) |
| H04N 19/137 | (2014.01) |

(52) U.S. Cl.
CPC ........... *H04N 7/365* (2013.01); *H04N 7/26313* (2013.01); *H04N 7/26797* (2013.01); *H04N 7/26132* (2013.01)
USPC ............ 375/240.16; 375/240.01; 375/240.15; 375/204.17; 375/204.18; 375/204.19; 348/488; 382/232; 382/233; 382/234; 382/235; 382/236; 382/237; 382/238; 382/239

(58) Field of Classification Search
CPC . F25D 23/067; F25D 25/024; H04N 7/26132; H04N 7/26313; H04N 7/26797; H04N 7/365; H04N 7/50; H04N 7/26244; H04N 5/145; H04N 7/26765; H04N 7/26015
USPC .......................... 375/240.16, 240.01–240.09, 375/240.17–240.29; 348/488; 382/232–239
See application file for complete search history.

(56) References Cited

U.S. PATENT DOCUMENTS

| 5,337,086 A * | 8/1994 | Fujinami ................. 375/240.16 |
| 5,825,421 A * | 10/1998 | Tan ........................ 375/240.15 |
| 6,058,212 A * | 5/2000 | Yokoyama ................. 382/236 |
| 7,515,637 B2 * | 4/2009 | Payson .................... 375/240.16 |
| 7,606,303 B2 * | 10/2009 | Nemiroff et al. ........... 375/240.01 |
| 8,098,728 B2 * | 1/2012 | Winder et al. ............ 375/240.12 |
| 2003/0053545 A1 * | 3/2003 | Lainema et al. .......... 375/240.16 |
| 2004/0264571 A1 * | 12/2004 | Zhang et al. ............. 375/240.16 |
| 2006/0031915 A1 * | 2/2006 | Winder et al. ................ 725/135 |
| 2006/0182177 A1 * | 8/2006 | Thomson et al. ........ 375/240.16 |
| 2008/0247462 A1 * | 10/2008 | Demos .................... 375/240.03 |
| 2008/0298472 A1 * | 12/2008 | Jain et al. ................. 375/240.29 |
| 2009/0067509 A1 * | 3/2009 | Poon ....................... 375/240.26 |
| 2009/0110067 A1 * | 4/2009 | Sekiguchi et al. ........ 375/240.12 |
| 2009/0161978 A1 * | 6/2009 | Karanovic ................... 382/260 |

(Continued)

FOREIGN PATENT DOCUMENTS

| JP | 09172644 A | 6/1997 |
| WO | 2006110013 A1 | 10/2006 |

OTHER PUBLICATIONS

Ishwar et al, "On Spatial Adaptation of Motion-Field Smoothness in Video Coding", Sep. 2000.*
French Search Report dated Feb. 24, 2009 from French Application No. 0854465 filed on Jul. 1, 2008.

Prakash Ishwar et al., "On Spatial Adaptation of Motion-Field Smoothness in Video-Coding" IEEE Transactions on Circuits and Systems for Video Technology, IEEE Service Center, Piscataway, NJ, US, vol.10, No. 6, Sep. 1, 2000, XP011014098.

International Search Report dated Feb. 2, 2010 for corresponding International Application No. PCT/FR2009/051264, filed Jun. 30, 2009.

English Translation of the Written Opinion dated Feb. 2, 2010 for corresponding International Application No. PCT/FR2009/051264, filed Jun. 30, 2009.

Office Action of the Russian Patent Office for corresponding Russian Patent Application No. 2011101514, dated Apr. 26, 2013.

* cited by examiner

*Primary Examiner* — Andy Rao
*Assistant Examiner* — Shan Elahi
(74) *Attorney, Agent, or Firm* — David D. Brush; Westman, Champlin & Koehler, P.A.

(57) ABSTRACT

A method and apparatus are provided for coding a sequence of images. The method includes a step of coding at least one block of a current image of the sequence, implementing a prediction associating the block with at least one corresponding block in a reference image. The prediction includes the following steps, for at least one given block of the current image or of the reference image: determination of a plurality of control vectors for the block; at least one splitting of the block into sub-blocks; determination of a plurality of control vectors for the sub-blocks; and determination of a prediction value for at least one point of the current image. Moreover, the method includes a step of inserting, into a signal representative of the sequence, information regarding reconstruction of the control vectors for the given block.

11 Claims, 6 Drawing Sheets

METHOD AND DEVICE FOR ENCODING A SEQUENCE OF IMAGES IMPLEMENTING A TEMPORAL PREDICTION, CORRESPONDING SIGNAL, DATA STORAGE MEDIUM, METHOD AND DECODING DEVICE AND COMPUTER PROGRAM PRODUCTS

CROSS-REFERENCE TO RELATED APPLICATIONS

This Application is a Section 371 National Stage Application of International Application No. PCT/FR2009/051264, filed Jun. 30, 2009 and published as WO 2010/001050 on Jan. 7, 2010, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of the encoding and decoding of image sequences.

More specifically, the disclosure pertains to the compression/decompression of image sequences or scenes (scenes of two dimensions or more) using a block-based transform. The disclosure can be applied especially to temporal prediction implemented in current video encoders (MPEG, H.264 etc) or future encoders (H.265).

BACKGROUND OF THE DISCLOSURE

Present day video encoders implementing video compression standards coming from the MPEG organization (MPEG-1, MPEG-2, MPEG-4, . . . ) or from the International Telecommunications Union ITU-T (H.261, . . . , H.264/AVC), are used to encode a sequence of images to deliver an encoded sequence, compressed in relation to the source image sequence.

To this end, these encoders use an encoding scheme using a prediction between the images of the sequence in order to obtain a major level of performance in compression.

It may be recalled that the images of a sequence are conventionally subdivided into slices which are then subdivided into macroblocks. Each macroblock is then subdivided into blocks of pixels where a block of pixels corresponds to a grouping of adjacent pixels. A block of pixels of an image of the sequence can then be encoded by temporal prediction from one or more blocks of one or more other images of the sequence. The term used then is "inter" block. A block of pixels can also be encoded by spatial prediction from one or more blocks of the image to be encoded. The term used then is "intra" block.

During the encoding of a block, it is specified whether or not this block is encoded by using information coming from other images of the sequence known as reference images. These reference images are images that have been encoded/decoded previously. A reference block corresponds to a grouping of pixels of a reference image.

More specifically, the encoding of an inter block runs in two steps:
 a prediction of the block to be encoded is first of all made by using one or more reference blocks and a motion compensation mechanism to take account of an apparent motion or again to achieve an efficient prediction;
 a prediction error residue is then computed, by determining the difference between the block to be encoded and the prediction.

The difference, or residue, between the current block and the predicted block is then encoded and transmitted (and/or stored depending on the applications). At the time of decoding, the received difference is added to the prediction to reconstruct the block.

Classically, in video compression standards, prediction by motion compensation of an inter block is achieved by means of a translation-type motion compensation. Thus, if v denotes the motion vector considered, and R is the reference image considered, the prediction P at each point or pixel x of the block is defined by: $P(x)=R(x+v)$.

One drawback of this motion compensation technique is that it cannot be used to take account of natural motions of a rotation, zoom, shearing or other type.

Other motion compensation variants are then proposed to make the prediction.

For example, P. Ishwar and P. Moulin in "*On Spatial Adaptation of Motion Field Smoothness in Video Coding*", have proposed a block-based motion compensation technique known as OBMC (Overlapped Block Motion Compensation) which consists in considering several values of motion vectors to set up a value of prediction of a pixel x of a block to be encoded:

$$P(x) = \sum_i w_i(x) R(x + v_i)$$

where: the vectors $v_i$ correspond to i motion vectors,
 the values $w_i(x)$ correspond to the weighting values between the different predictions obtained by the different motion vectors.

The weighting values $w_i(x)$ are generally dependent on the position of the point x considered in the block. Typically, the weights $w_i(x)$ used are the same for all the blocks.

Although this technique can be used to take account of a large family of natural motions, the prediction obtained is of average quality. The volume of information of prediction residue to be transmitted is therefore greater and this transmission of additional information entails penalties in terms of compression performance.

There is therefore a need for new image encoding/decoding techniques, having low complexity while at the same time providing high-quality prediction, to at least partially mitigate the drawbacks of the prior art.

SUMMARY

An embodiment of the invention relates to a method for encoding a sequence of images comprising a step of encoding at least one block of a current image of the sequence, implementing a prediction associating the block with at least one corresponding block in a reference image of the sequence.

According to an embodiment of the invention, the prediction comprises the following steps for at least one given block of the current image or of the reference image respectively:

determining a plurality of control vectors for said block, each representing a shift between a characteristic point of the block and a corresponding position of said characteristic point in the reference image or in the current image respectively;

making at least one subdivision of the block into sub-blocks;

determining a plurality of control vectors for the sub-blocks from the control vectors for the block;

determining a value of prediction for at least one point of the current image, from a motion compensation of at least one of said sub-blocks, performed from the control vectors determined for the sub-block.

The encoding method also comprises a step of insertion, in a signal representing the sequence, of information for reconstructing control vectors for the given block.

An embodiment of the invention thus proposes a novel technique of prediction of an "inter" block providing efficient prediction quality while at the same time preserving low complexity. The proposed solution also takes account of natural motions in the image sequence in taking account of the motion of a block relatively to at least one of its neighbors (i.e. blocks situated to the left, to the right, or above, or below this block).

To this end, an embodiment of the invention proposes to determine several control vectors for a block (for example two, three, four or more vectors) defined as a function of the connection of this block to one or more of its neighbors.

For example, the control vectors for the block or sub-block are each associated with one of the vertices of the block or sub-block. Thus, for a 2D image, four control vectors are associated with the block, one control vector being associated with each vertex, or corner of the block. For a 3D image, eight vectors are associated with the block, which actually corresponds to a cube, a control vector being associated with each corner of the block. It is also possible to associate these control vectors with other points of the block, corresponding for example to a contour. In the same way, the number of control vectors associated with a block is not fixed.

In particular, the proposed technique is used to encode the image sequence by using forward and/or backward projections Thus, if the technique used implements a backward projection, the projection is a prediction by backward motion compensation, and the control vectors point from the current image to one or more reference images. In this case, a plurality of control vectors is determined for a given block belonging to the current image.

Conversely, if the technique used implements a forward projection, the prediction is a prediction by forward motion compensation, and the control vectors point from one or more reference images to the current image. Then, a plurality of control vectors is determined for a given block belonging to a reference image.

For at least one given block of the reference image or of the current image, the block is then subdivided into sub-blocks for which a plurality of control vectors is determined. These sub-blocks can especially be of different sizes.

Such a subdivision especially makes it possible to take account of the natural motions in the image sequence such as affine deformation motions while at the same time performing only block translation operations. These block translation operations thus significantly limit the complexity of the computation of the image interpolated values at sub-pixel positions (i.e. the block-sharing of the computation is more efficient than separate point-based computation).

According to one particular aspect of an embodiment of the invention, the pieces of information for reconstructing control vectors include control vectors for the given block or information representing these control vectors. Thus, these control vectors for the block can be easily reconstructed at the decoder.

According to one variant, the pieces of information for reconstructing the control vectors include at least one connection flag representing a motion between the given block and at least one neighboring block.

For example, the pieces of information for reconstructing the control vectors comprise two connection flags, including:

a first flag representing a motion between the given block and the block situated above the given block, between the current image and the reference image, and a second flag representing a motion between the given block, and the block situated to the left of the given block, between the current image and the reference image.

These flags, denoted for example as "flag_tc" for the first flag, and "flag_lc" for the second flag, are used to associate the motions of the given block and its neighbor (top or left neighboring block) between the current image and the reference image. Once received by a decoder, these flags will be used to reconstruct the control vectors.

For example, if the given block and the block situated above it have a common ridge both in the current image and in the reference image, after motion compensation, then the second flag is equal to 1 (flag_tc=1). The two blocks are then said to be connected.

If the given block and the block situated to its left have a common ridge both in the current image and in the reference image, after motion compensation, then the second flag is equal to 1 (flag_lc=1).

An embodiment of the invention also pertains to a computer program product downloadable from a communications network and/or stored on a non-transitory computer-readable medium and/or executable by a processor, comprising program code instructions for implementing the encoding method as described here above, when the program is executed on a computer.

In another embodiment, the invention pertains to a device for encoding a sequence of images, comprising means for encoding at least one block of a current image of the sequence, implementing prediction means associating said block with at least one corresponding block in a reference image of the sequence.

According to an embodiment of the invention, the prediction means comprise, for at least one given block of the current image or of the reference image respectively:

means for determining a plurality of control vectors for the block;

means for subdividing the block into sub-blocks;

means for determining a plurality of control vectors for the sub-blocks from the control vectors determined for the block;

means for determining a value of prediction for at least one point of the current image, from a motion compensation of at least one of said sub-blocks, performed from the control vectors determined for the sub-block.

Furthermore, an encoding device of this kind has means for the insertion, into a signal representing the sequence, of information for reconstructing control vectors for the given block.

Such an encoding device is adapted especially to implementing the above-described encoding method. It is for example an MPEG or H.264 type video encoder, or an encoder using a future video compression standard.

Yet another aspect of an embodiment of the invention pertains to a signal representing an image sequence encoded according to the encoding method described here above.

Such a signal comprises at least one piece of information for reconstructing control vectors for the given block.

This signal could of course include the different characteristics pertaining to the encoding method of an embodiment of the invention.

For example, the reconstruction information includes at least one connection flag representing a motion between the given block and at least one neighboring block.

According to one variant, the reconstruction information includes the control vectors, or a piece of information representing these vectors, for the given block.

In particular, such a signal also includes the difference, or residue, between the current image block and the prediction.

The signal may also convey information on the order of subdivision of the blocks.

An embodiment of the invention also pertains to a storage medium bearing a signal as described here above.

Yet another aspect of an embodiment of the invention concerns a method for decoding a signal representing a sequence of images comprising a step of reconstructing at least one image of the sequence, from a prediction of the image to be reconstructed, said prediction associating a block of the image to be reconstructed with at least one corresponding block in a reference image of the sequence.

Such a decoding method comprises a step of obtaining information on reconstruction of control vectors for at least one given block of the image to be reconstructed or of the reference image respectively.

Furthermore, the prediction includes the following steps for the given block:
  determining a plurality of control vectors for the block, each representing a shift between a characteristic point of said block and the corresponding position of said characteristic point in the reference image or in the image to be reconstructed respectively, from said information on reconstruction;
  at least one subdivision of the block into sub-blocks;
  determining a plurality of control vectors for the sub-blocks from the control vectors for the block;
  determining a value of prediction for at least one point of the image to be reconstructed from a motion compensation of at least one of said sub-blocks, performed from the control vectors determined for the sub-block.

Such a method is especially adapted to decoding a sequence of images encoded according to the above-described encoding method. In this way, the same steps of prediction are performed as were performed at encoding, so as to reconstruct the given block by adding the prediction residue (transmitted in the signal), to the prediction.

The prediction performed on the decoding side uses information on reconstructing control vectors transmitted in the signal.

Thus, according to a first embodiment, the obtaining step includes a step of extracting at least one connection flag representing a motion between the given block and at least one neighboring block.

The flags are for example "flag_tc" (first flag) and "flag_lc" (second flag) transmitted in the signal.

These flags are used especially to reconstruct the control vectors for the given block.

According to a second embodiment, the obtaining step includes a step of receiving control vectors for said given block.

In particular, the decoding method includes a step of decision and/or of parametrizing the subdivision, making it possible to decide whether the given block should be subdivided and/or to parametrize the subdivision of the given block. These steps of decision and/or parametrizing are defined in taking account of a predetermined criterion belonging to the group comprising:
  a predetermined number of sub-blocks for the block;
  a piece of information on similitude between said control vectors;
  a size of said block;
  an flag representing a subdivision number;
  etc.

In this way, all the blocks of an image to be reconstructed or blocks of a reference image are not necessarily subdivided into sub-blocks, and the subdivision into sub-blocks may vary from one block to another of the image. The partitioning into sub-blocks is therefore adaptive.

An embodiment of the invention also pertains to a computer program product downloadable from a communications network and/or stored on a non-transitory computer-readable medium and/or executable by a processor, comprising program code instructions for implementing the decoding method as described here above, when the program is executed by a processor.

Another embodiment of the invention pertains to a device for decoding a signal representing a sequence of images, comprising means for reconstructing at least one image of the sequence, implementing means for predicting the image to be reconstructed, associating a block of the image to be reconstructed with at least one corresponding block in a reference image of the sequence.

Such a device comprises means for obtaining information on reconstructing control vectors for at least one given block of the image to be reconstructed or of the reference image respectively.

Furthermore, the prediction means include, for the given block:
  means for determining a plurality of control vectors for the block from reconstruction information;
  means for subdividing the block into sub-blocks;
  means for determining a plurality of control vectors for the sub-blocks from the control vectors for the block;
  means for determining a value of prediction for at least one point of the image to be reconstructed from a motion compensation of at least one of said sub-blocks, performed from the control vectors determined for the sub-block.

A decoding device of this kind is especially adapted to implementing the decoding method described here above. It is for example an MPEG or H.264 type video decoder, or a decoder using any future standard of video compression.

BRIEF DESCRIPTION OF THE DRAWINGS

4. List of Figures

Other features and advantages shall appear more clearly from the following description of a particular embodiment given by way of a simple illustrative and non-restrictive example and from the appended drawings, of which.

DETAILED DESCRIPTION OF ILLUSTRATIVE EMBODIMENTS

1 General Principle

The general principle of an embodiment of the invention relies on the encoding and decoding of a sequence of images implementing a temporal prediction associating a block of an image to be encoded with at least one corresponding block in a reference image of the sequence.

More specifically, an embodiment of the invention proposes a novel technique of prediction by motion compensation of a block encoded in "inter" mode. The technique proposed can be used to obtain a representation of a natural motion by limiting the complexity that it brings, as regards both the computations and the number of parameters to be transmitted.

An embodiment of the invention can be applied especially to the encoding of image sequences or scenes represented by means of motion tubes where a motion tube corresponds to a block of pixels changing in time. During this change, the tube can get deformed, for example to take account of the apparent motion or if the number of pixels present in the block increases or diminishes. This tube can also be refined for example in passing to the sub-pixel level of the block. An embodiment of the invention can be used especially to determine the deformations undergone by a tube.

In particular, it may be recalled that a motion tube is defined by at least the following pieces of information:
- a block of reference pixels comprising information on reference texture;
- tube starting and ending instants;
- information on transition, used to update said reference block and at least one instant of said sequence.

Such a technique for representing image sequences is described especially in the French patent application no 0756007 filed 25 Jun. 2007 on behalf of the present Applicant.

The temporal prediction according to an embodiment of the invention relies on the determining of a plurality of control vectors for at least one block, the subdividing of at least this block into sub-blocks and the determining of a plurality of control vectors for the sub-blocks. These control vectors are then used to determine a prediction of the sub-blocks and then of the block.

2. Motion Compensation

Here below, referring to FIG. 1A, we describe the main steps implemented for the prediction by motion compensation, implemented in a video encoder of the H.264 type for example.

It can be noted that an embodiment of the invention can be applied to blocks as well as to macroblocks as understood in the H.264 standard. The term <<block>> in the description must therefore be understood to mean <<macroblock>> or <<block>> according to the meaning of this standard, barring indications to the contrary.

Figure 1A:
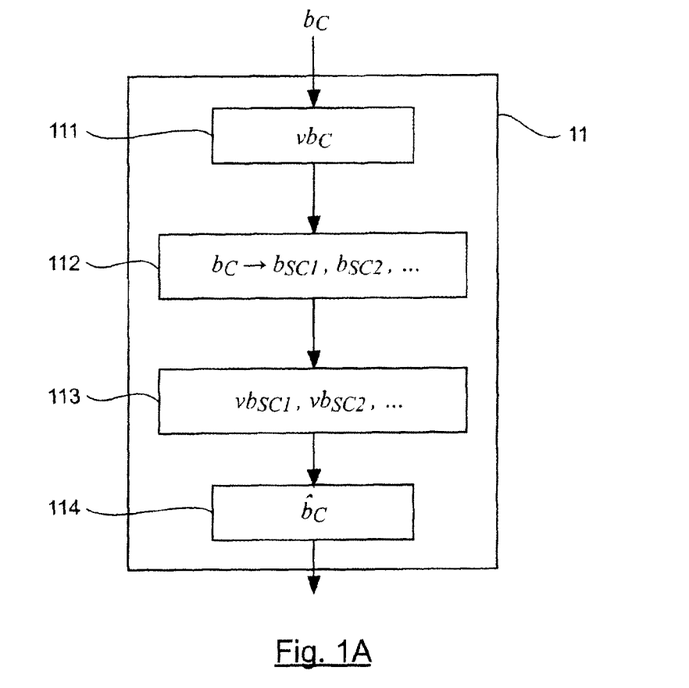
FIGS. 1A and 1B represent the main steps of the prediction by motion compensation and of the encoding method according to one embodiment of the invention.

As illustrated in FIG. 1A the prediction by motion compensation (11) of at least one block of a current image of an image sequence implements the following steps for at least a given block $b_C$ of a first image;
- determining 111 a plurality of control vectors $vb_C$ for the block $b_C$, each representing a shift between a characteristic point of the block $b_C$ and its corresponding position in a second image;
- at least one subdivision 112 of the block $b_C$ into sub-blocks $b_{SC1}$, $b_{SC2}$, etc;
- determining 113 a plurality of control vectors $vb_{SC1}$, $vb_{SC2}$, etc for the sub-blocks, on the basis of the control vectors $vb_C$ for the blocks;
- determining 114 a value of prediction for at least one point of the current image on the basis of a motion compensation performed on the basis of the control vectors $vb_{SC1}$, $vb_{SC2}$, etc, determined for the sub-block.

In particular, if the prediction implements a backward motion compensation, the first image is the current image and the second image is a reference image. It may be recalled that a reference image corresponds to a previously encoded/decoded image.

If the prediction implements a forward motion compensation, the first image is a reference image and a second image is the current image.

In this way, a prediction of at least one current image block, also called a predicted block $\hat{b}_C$, is determined.

Here below, a more detailed description is provided of the different steps implemented to determine the prediction of an inter-encoded block. The steps for determining the control vector and for subdividing a block into sub-blocks are described for the case of backward motion compensation, according to which the control vectors point from the current image to one or more reference images. Those skilled in the art will extend this teaching without difficulty to a forward motion compensation according to which the control vectors point from a reference image to the current image, in replacing the current image by the reference image and vice versa. The step of determining the prediction value of a point or pixel is then described for each of the two types of motion compensation.

A) Determining Control Vectors

First of all, in a classic way, a motion vector is determined for the block $b_C$ of the current image $I_C$. This motion vector is denoted as v.

Then a plurality of control vectors $vb_C$ is determined (111) for the block $b_C$. In this embodiment, four control vectors are determined for the block, each being associated with a vertex or corner of the block.

For example, the following are noted
- $v_{br}$ the control vector associated with the corner situated at the bottom right hand of the block $b_C$;
- $v_{bl}$ the control vector associated with the corner situated at the bottom left hand of the block $b_C$;
- $v_{tr}$ the control vector associated with the corner situated at the top right hand corner of the block $b_C$;
- $v_{tl}$ the control vector associated with the corner situated at the top left hand corner of the block $b_C$.

These control vectors are initialized with a zero value.

On the encoding side, the position of the block $b_C$ in the current image $I_C$ is compared with that of its neighbors, and the position of the corresponding block in the reference image $I_R$ is compared with that of its neighbors.

For example, if the block $b_C$ and the block situated above have a ridge common both to the current image and the reference image after motion compensation, then it means that the two blocks are vertically connected.

The value 1 is then assigned to a first flag flag_tc.

If the block $b_C$ and the block situated to its left have a ridge common both to the current image and the reference image after motion compensation, then it means that the two blocks are horizontally connected.

The value 1 is then assigned to a second flag flag_lc.

These flags are used to represent the motions of the block $b_C$ and of its neighbor (top or left) between the current image and the reference image. They may be used to determine the control vectors. These flags can be used to reconstruct the control vectors if they are received by a decoder.

Optionally, for an implementation with reduced signaling, the two flags flag_tc and flag_lc can be constrained to take the same value. They are then represented by a single flag, flag_c taking a single value 0 or 1. In this variant, a unique flag is therefore used by a decoder to reconstruct the control vectors.

Figure 2:
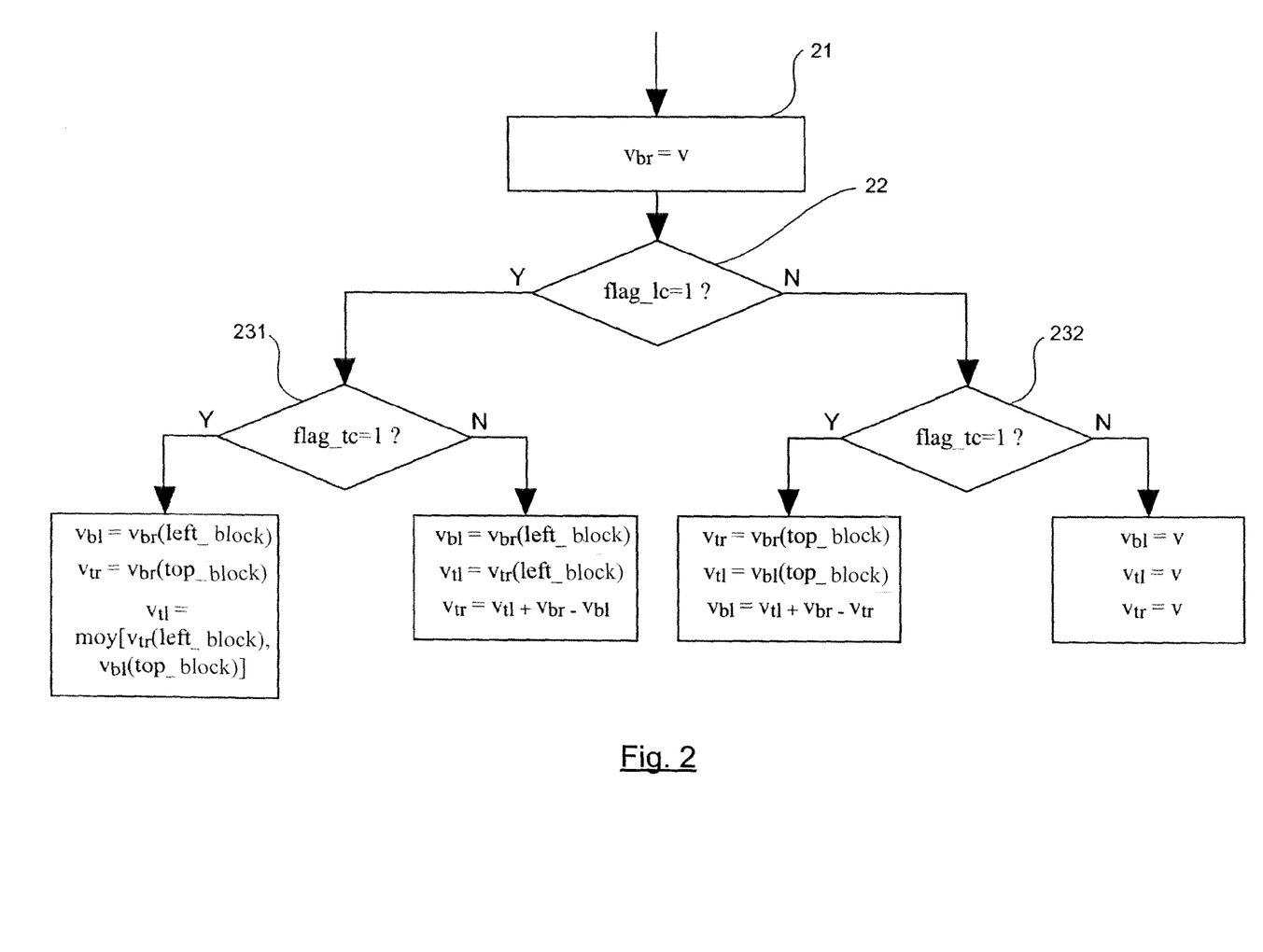
FIG. 2 proposes an algorithm to determine control vectors for a block.

After analysis of the current and reference images, we determine the control vectors $v_{br}$, $v_{bl}$, $v_{tr}$ et $v_{tl}$ for the block $b_C$, as proposed in FIG. 2.

For example, the control vector $v_{br}$ associated with the corner situated at the bottom right hand of the block $b_C$ is allotted 21 the motion vector v, predefined for the block.

A check is then made (22) to see if the flag_lc is equal to 1, which means the block $b_C$ and the block situated to its left are connected horizontally.

A check is also made (231, 232) to see if flag_tc is equal to 1, meaning that the block $b_C$ and the block situated above are vertically connected.

If the flag_lc is equal to 1, then the control vector $v_{bl}$ takes the value of the control vector $v_{br}$ of the block situated to the left of the block $b_C$ ($v_{bl}=v_{br}$(left_block)). These notations have been chosen so as to facilitate the reading and understanding of the equation by those skilled in the art in the field considered.

Furthermore, in vertical connected mode (flag flag_tc equal to 1), the control vector $v_{tr}$ takes the value of the control vector $v_{br}$ of the block situated above the block $b_C$ ($v_{tr}=v_{br}$ (top_block)), and the control vector $v_{tl}$ takes the mean value of the control vector $v_{bl}$ of the block situated above the block $b_C$ and of the control vector $v_{tr}$ of the block situated to the left of the block $b_C$ ($v_{tl}$=moy[$v_{tr}$(left_block), $v_{bl}$(top_block)]).

In the vertical non-connected mode (flag_tc equal to 0), the control vector $v_{tl}$ takes the value of the control vector $v_{tr}$ of the blocks situated to the left of the block $b_C$ ($v_{tl}=v_{tr}$(left_block)), and the control vector $v_{tr}$ is obtained from three other control vectors of the block $b_C$ ($v_{tr}=v_{tl}+v_{br}-v_{bl}$).

If during the step 22, it is observed that flag_lc is not equal to 1, which means that the block $b_C$ and the block situated to its right are in non-connected mode, we obtain:

In vertical connected mode (flag flag_tc equal to 1):
the control vector $v_{tr}$ takes the value of the control vector $v_{br}$ of the block situated above the block $b_C$ ($v_{tr}=v_{br}$ (top_block));
the control vector $v_{tl}$ takes the value of the control vector $v_{bl}$ of the block situated above the block $b_C$ ($v_{tl}=v_{bl}$(top_block));
the control vector $v_{bl}$ is obtained from the other three control vectors of the block $b_C$ ($v_{bl}=v_{tl}+v_{br}-v_{tr}$);
in vertical, non-connected mode (flag_tc equal to 0):
the control vectors $v_{tl}$, $v_{tr}$ and $v_{bl}$ all take the value of the control vector $v_{br}$ of the block $b_C$ ($v_{bl}=v_{tl}=v_{br}=v_{tr}=v$).

In particular, if a block does not have any neighbors to its left, then the control vectors associated with its top left-hand and bottom left-hand corners are defined from control vectors determined for its top right-hand and bottom right-hand corners ($v_{bl}=v_{br}$ and $v_{tl}=v_{tr}$). In the same way, if a block has no neighbor above it, then the control vectors above it associated with its top left-hand corners and top right-hand corners are defined on the basis of control vectors determined for its bottom left-hand and bottom right-hand corners ($v_{tl}=v_{bl}$ and $v_{tr}=v_{br}$). If a block has neither a neighbor to the left nor a neighbor above then the control vectors associated with its top left-hand corners, top right-hand and bottom right-hand corners are defined on the basis of the control vector determined for its bottom right-hand corner ($v_{bl}=v_{tl}=v_{tr}=v_{br}$).

According to the embodiment presented, the flags flag_lc and flag_tc are transmitted to the decoder in the form of information for the reconstruction of control vectors for the block $b_C$.

In particular, the flags may be defined by a set of blocks or again block by block. Furthermore, these flags may be exploited during the definition of the motion vector v for the given block. Indeed, these pieces of information can be used for example in the prediction mode used for the prediction of the motion vector associated with the given block.

Thus, if the given block and the block situated above it are connected and if the given block is not connected to the block situated to its left, then the encoding of the motion vector of the given block can be done by means of a prediction defined by the motion vector of the block situated above (and not a prediction on the basis of the median vector of the neighboring blocks, as used in the encoder of the prior art).

Similarly, if the given block and the block situated to its left are connected, and if the given block is not connected to the block situated above it, then the encoding of the motion vector of the given block can be done by means of a prediction defined by the motion vector of the block situated to its left (and not a prediction on the basis of the median vector of the neighboring blocks as used in an encoder of the prior art).

Furthermore, according to the embodiment presented, only one motion vector can be encoded, the vector v ($v=v_{br}$). The other motion vectors ($v_{tr}$, $v_{tl}$, $v_{bl}$) may be defined by means of the flags flag_lc and flag_tc.

FIGS. 3A to 3F illustrate especially the determining of the control vectors for the block $b_C$ of a current image $I_C$, for a prediction by backward motion compensation according to which the control vectors point from the current image $I_C$ to a reference image $I_R$.

Figure 3A:
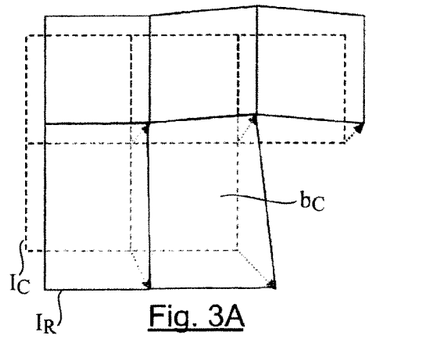
FIGS. 3A to 3G illustrate the determining of vectors for a block in taking account of its neighbors.

More specifically, FIG. 3A illustrates the determining of the control vectors for the block $b_C$ if the block situated to the left and above the block $b_C$ are consistent, i.e. that the bottom left-hand corner of the block situated above the block $b_C$, and the top right-hand corner of the block situated to the left of the block $b_C$ are connected and the flags flag_lc and flag_tc are equal to 1.

Figure 3B:
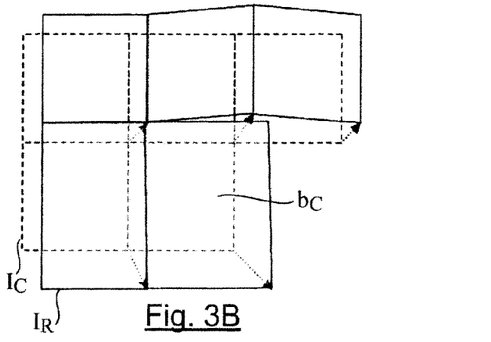

FIG. 3B illustrates the case where the blocks situated to the left and above the block $b_C$ are consistent, flag_lc equal to 1 and flag_tc equal to 0.

Figure 3C:
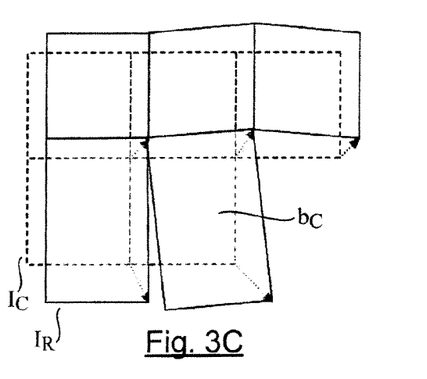

FIG. 3C illustrates the case where the blocks situated to the left and above the block $b_C$ are consistent, flag_lc equal to 0 and flag_tc equal to 1.

Figure 3D:
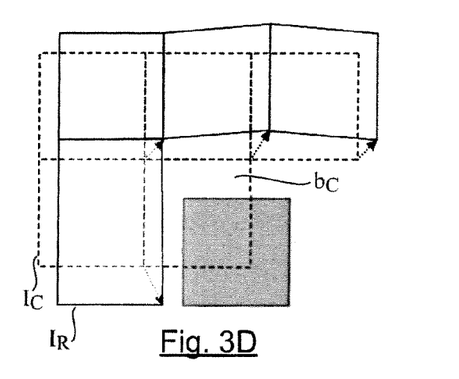

FIG. 3D illustrates the case where the blocks situated to the left and above the block $b_C$ are consistent, and the flags flag_lc and flag_tc are equal to 0.

Figure 3E:
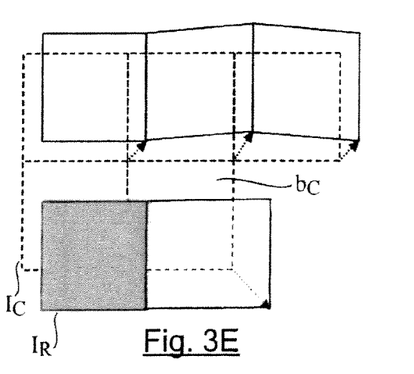

FIG. 3E illustrates the case where the blocks situated to the left and above the block $b_C$ are not consistent, i.e. that the bottom left-hand corner of the block situated above the block $b_C$, and the top right-hand corner of the block situated to the left of the block $b_C$ are different, flag_lc is equal to 1 and flag_tc is equal to 0.

Figure 3F:
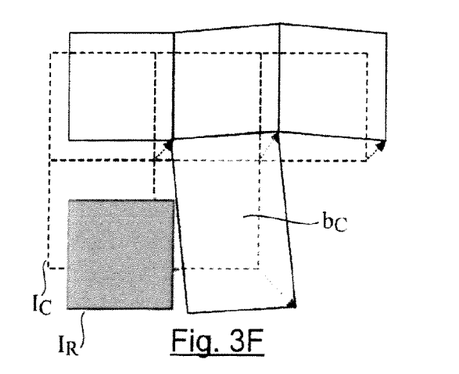

FIG. 3F illustrates the case where the blocks situated to the left and above the block $b_C$ are not consistent, flag_lc is equal to 0 and flag_tc is equal to 1.

Figure 3G:
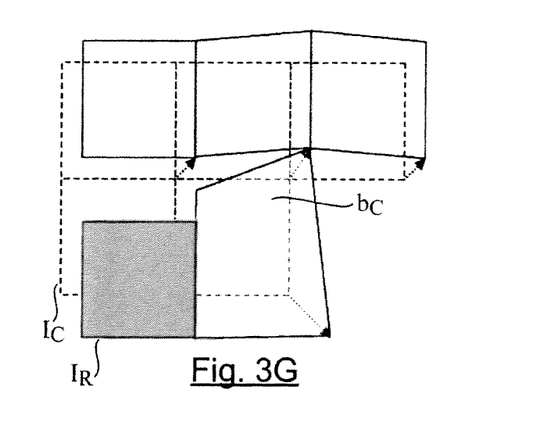

FIG. 3G illustrates the case where the blocks situated to the left and above the block $b_C$ are not consistent, and flag_lc and flag_tc are equal to 1.

B) Subdivision of a Block into Sub-Blocks.

Here below we provide a more precise description of the step 112 of the subdivision of the block $b_C$ into sub-blocks. It may be recalled that according to an embodiment of the invention at least one block of the current image is subdivided into sub-blocks.

The four control vectors defined for the block $b_C$ are then used in order to be interpolated to define the control vectors of the different sub-blocks. For example, we determine four control vectors for each sub-block.

Figure 4:
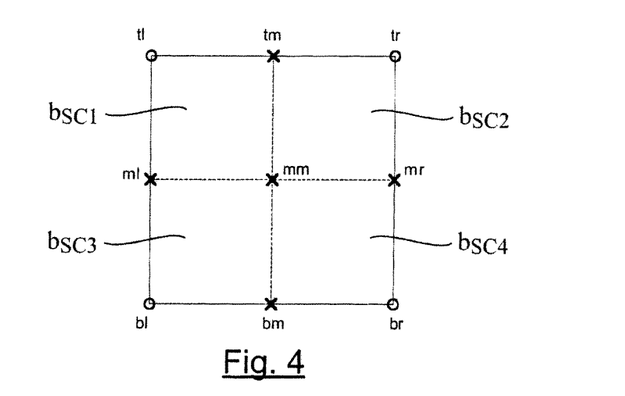
FIG. 4 shows an example of subdivision of a block into sub-blocks.

Thus, as illustrated in FIG. 4, the block $b_C$ is for example subdivided into four sub-blocks $b_{SC1}$, $b_{SC2}$, $b_{SC3}$ and $b_{SC4}$. The control vectors attached to the block $b_C$ are the interpolated to define the new control vectors for the sub-blocks. For example, the following notations are used:

$v_{ml}$ the control vector associated with the corner situated at the bottom left of the sub-block $b_{SC1}$, also corresponding to the corner situated at the top left of the sub-block $bs_{C3}$;

$v_{tm}$ the control vector associated with the corner situated at the top of the sub-block $b_{SC1}$, also corresponding to the corner situated at the top left of the sub-block $b_{SC2}$ $v_{mr}$ the control vector associated with the corner situated at the bottom right of the sub-block $b_{SC2}$, also corresponding to the corner situated at the top right of the sub-block $b_{SC4}$;

$v_{bm}$ the control vector associated with the corner situated at the top right of the sub-block $bs_{C3}$, also corresponding to the corner situated at the bottom left of the sub-block $b_{SC4}$; and $v_{mm}$ the control vector associated with the corner situated at the bottom right of the sub-block $b_{SC1}$, also corresponding to the corner situated at the bottom left of the sub-block $b_{SC2}$, the corner situated at the top right of the sub-block $b_{SC3}$, and the corner situated at the top left of the sub-block $b_{SC4}$.

The control vectors for the sub-blocks are then determined from the control vectors for the block $b_C$, for example as follows:

$$v_{tm} = \frac{v_{tl} + v_{tr}}{2}, \quad v_{bm} = \frac{v_{bl} + v_{br}}{2},$$
$$v_{ml} = \frac{v_{tl} + v_{bl}}{2}, \quad v_{mr} = \frac{v_{tr} + v_{br}}{2} \text{ et } v_{mm} = \frac{v_{tl} + v_{tr} + v_{bl} + v_{br}}{4}.$$

These control vectors are then allotted to the different sub-blocks:

the sub-block $b_{SC1}$ situated at the top left has, as control vectors, the motion vectors $v_{tl}$, $v_{tm}$, $v_{ml}$, $v_{mm}$;
the sub-block $b_{SC2}$ situated at the top left has, as control vectors, the motion vectors $v_{tm}$, $v_{tr}$, $v_{mm}$, $v_{mr}$;
the sub-block $b_{SC3}$ situated at the bottom left has, as control vectors, the motion vectors $v_{ml}$, $v_{mm}$, $v_{bl}$, $v_{bm}$;
the sub-block $b_{SC4}$ situated at the bottom right has, as control vectors, the motion vectors $v_{mm}$, $v_{mr}$, $v_{bm}$, $v_{br}$.

The number of subdivisions may depend on several parameters. For example, it may be defined by an overall parameter defined for a set of blocks or else adaptive by block. Thus, a block is partitioned into sub-blocks of smaller size for which a specific prediction is made. Then, variable block sizes appear in order to obtain the motion compensation.

More specifically, the number of subdivisions may be defined according to the size of the block or according to a predefined number of sub-blocks for the block. For example, a macro-block sized 16×16 may be subdivided into 8 blocks sized 4×8 or 8×4 or four blocks sized 8×8 or into blocks formed by two blocks sized 8×16 or 16×8.

According to one variant, the control vectors associated with the block $b_C$, are compared two by two so as to obtain a piece of information on similitude. The block $b_C$ is then subdivided into sub-blocks only if the information on similitude is above at least one predetermined threshold.

In the case where it is adaptive by block, we can define the number of subdivisions to be made as a function of the maximum difference between the amplitude of the control vectors (for example by a simple quantification of the value of maximum difference).

C) Determining the Prediction Value for at Least One Point of the Current Image for a Backward Motion Compensation of a Sub-Block of the Current Image.

Figure 5:
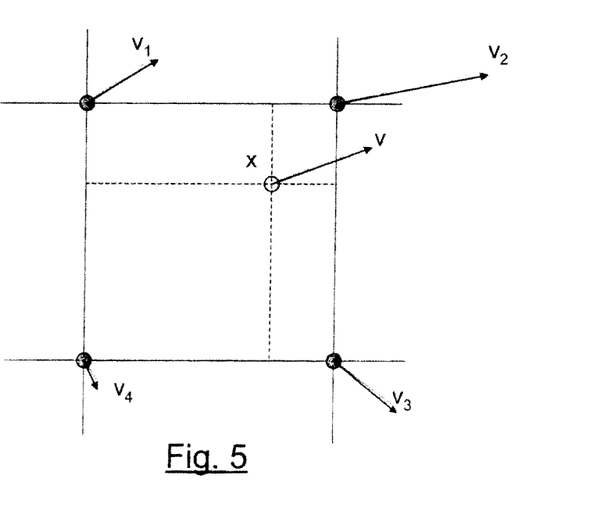
FIG. 5 illustrates the determining of a prediction value for a pixel.

We present here below the step 114 for determining a prediction value for at least one pixel of the current image from a backward motion compensation performed on the basis of the control vectors determined for a sub-block of the current image as illustrated in FIG. 5.

Given a sub-block and its four control vectors, we establish for any point x of this sub-block a prediction P(x) by means of the following equation:

$$P(x) = w_1(x)I_R(x+v_1) + w_2(x)I_R(x+v_2) + w_3(x)I_R(x+v_3) + w_4(x)I_R(x+v_4) \text{ with:}$$

$(v_1, v_2, v_3, v_4) = (v_{tl}, v_{tm}, v_{mm}, v_{ml})$ for the sub-block $b_{SC1}$;
$(v_1, v_2, v_3, v_4) = (v_{tm}, v_{tr}, v_{mr}, v_{mm})$ for the sub-block $b_{SC2}$;
$(v_1, v_2, v_3, v_4) = (v_{ml}, v_{mm}, v_{bm}, v_{bl})$ for the sub-block $b_{SC3}$; and
$(v_1, v_2, v_3, v_4) = (v_{mm}, v_{mr}, v_{br}, v_{bm})$ for the sub-block $b_{SC4}$.

The weighting values $w_1(x)$, $w_2(x)$, $w_3(x)$, $w_4(x)$ may be determined as described in the document "*On Spatial Adaptation of Motion Field Smoothness in Video Coding*" mentioned here above. Other known techniques can also be envisaged.

Thus, we determine a prediction of at least one block of the current image Ic.

D) Determining the Prediction Value for at Least One Point of the Current Image for a Forward Motion Compensation of a Sub-Block of a Reference Image Here below, we present the step 114 for determining a value of prediction for at least one pixel of the current image on the basis of a forward motion compensation performed on the basis of the control vectors determined for a sub-block of a reference image.

In the case of the forward motion compensation, the blocks of the current image can be predicted by several blocks of one or more reference images. In order to compute, for a point of the current image, a prediction value it is necessary to project all the blocks of the reference images on the current image in order to determine which blocks can be used to predict the point of the current image.

We propose here below an algorithm for building a prediction image for the current image.

During a first step, we initialize a prediction image. Thus, for any point x of the image we have: RI(x)=0, RW(x)=0. RI corresponds to the prediction image in which all the prediction values given by the blocks of the reference images are weighted and accumulated, RW corresponds to the weight accumulation image.

For any sub-block $b_{SC1}$, $b_{SC2}$, ..., the following steps are implemented:

for each motion vector of the sub-block, the prediction image is updated for ab equal to tl, tr, bl and then br. For any x in the sub-block:

the value $w_{ab}(x)*P(x)$ at the points $RI(x+v_{ab})$: $RI(x+v_{ab})+=w_{ab}(x)*P(x)$, is accumulated, P(x) being the prediction at the point x of the sub-block;

the value $w_{ab}(x)$ at the points $RW(x+v_{ab})$: $RW(x+v_{ab})+=w_{ab}(x)$ is accumulated.

The weight $w_{ab}$ used during the forward motion compensation can take the value of the weights used in a backward motion compensation as well as different values. In particular, their values can differ and be adaptive by block. For example, this adaptation may be dependent on the similitude of the control motion vectors.

The prediction image is then standardized for any point x in the image:

if RW(x) is different from 0, RI(x) is divided by RW(x): RW(x)!=0 then RI(x)/=RW(x);

if not, RI(x) is updated at a predefined value UNDEF, for example the value 0.

Optionally, the non-defined values for which RW(x) is equal to 0 are modified in order to have a more probable value relatively to their neighborhood. This last step may be performed in different ways, for example in defining for any value not defined the value of the point y that is closest in the prediction image that has an accurately defined value (i.e. RW(y) different from 0).

In this way, a prediction of the current image blocks $I_C$ is defined.

3. Encoding

Here below, referring to FIG. 1B, we define the main encoding steps implemented in an H.264 type video encoder for example. In particular, the method of an embodiment of the invention may be implemented in various ways, especially in wired form or software form.

Figure 1B:
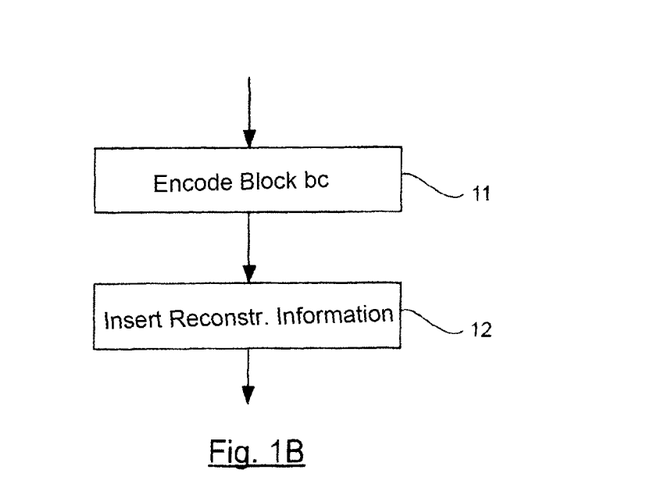

As illustrated in FIG. 1B, the encoding method of an embodiment of the invention includes a step of encoding 11 for encoding at least one block $b_C$ of a current image $I_C$ of an image sequence implementing a prediction by motion compensation as described here above with reference to FIG. 1A.

In this way, we determine a prediction of at least one current image block $I_C$, also called a predicted block $\hat{b}_C$.

We then classically determine a prediction error residue corresponding to the difference between the current image block and the predicted block $\hat{b}_C$.

Finally, at a step 12, information on reconstruction of the control vectors for the block $b_C$ is inserted into a signal representing the sequence of images.

For example, these pieces of reconstruction information take the form of connection flags representing a motion between the block $b_C$ and at least one neighboring block or they comprise directly the control vectors for the block $b_C$.

The prediction error residues are also inserted into the signal. These residues could be used by the decoder during the reconstruction of the image sequence.

The signal representing the image sequence can then be transmitted and/or stored on a recording medium.

4. Signal

Once encoded, the images of the sequence are transmitted to a decoder.

Furthermore, information elements on reconstruction of the control vectors for the block $b_C$ are inserted into this signal. For example, these pieces of reconstruction information include the flags flag_lc and flag_tc.

According to one embodiment, the prediction error residues are also inserted into the signal, especially the prediction residue of the motion vector v which will be used by the decoder during the reconstruction of the image sequence.

It is also possible to insert a flag specifying the number of sub-division operations undergone by the block $b_C$ at the encoder. In this way, it is ensured that the sub-division performed during the prediction by the encoder is identical to the sub-division performed during the prediction by the decoder.

5. Decoding

Figure 6:
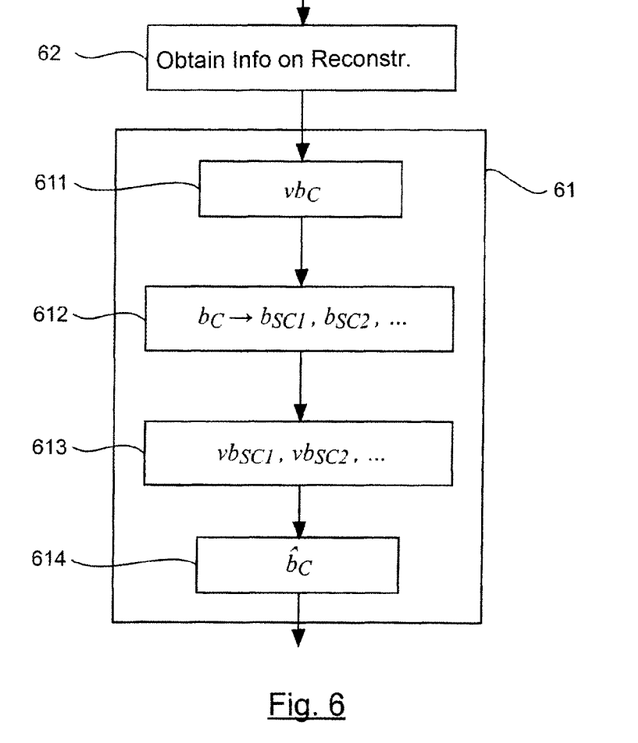
FIG. 6 presents the main steps for the decoding method according to one embodiment of the invention.

Referring now to FIG. 6, we present the main steps of decoding implemented by an H.264 type video decoder for example.

The method of an embodiment of the invention can be implemented in various ways, especially in wired form or software form.

It is assumed that the decoder receives a signal representing a sequence of images, encoded for example according to the encoding method described here above.

More specifically, as illustrated in FIG. 6, the decoding method according to an embodiment of the invention has a step 61 for reconstructing at least one image of the sequence, from a prediction of the image to be reconstructed and a step of obtaining 62 information on reconstruction of the control vectors for at least one given block $b_C$ of the message to be reconstructed or a reference image.

According to this example, the following steps are implemented for at least the given block $b_C$ of the image to be reconstructed or a reference image:

determining 611 a plurality of control vectors $vb_C$ for the block $b_C$, each representing a shift between a characteristic point of the block $b_C$ and its corresponding position in the reference image or in the image to be reconstructed, on the basis of the reconstruction information;

at least one sub-division 612 of the block $b_C$ into sub-blocks $b_{SC1}$, $b_{SC2}$, etc;

determining 613 a plurality of control vectors $vb_{SC1}$, $vb_{SC2}$, etc for the sub-blocks on the basis of the control vectors for this block;

determining 614 a prediction value for at least one pixel of the image to be reconstructed, on the basis of a motion compensation of at least one of the sub-blocks, made on the basis of control vectors determined for the sub-block.

In this way, a prediction is determined for at least one block of the image to be reconstructed, also called a predicted block $\hat{b}_C$.

Then, classically the prediction error residue determined during the encoding of the predicted block is added so as to determine a reconstructed block of the image to be reconstructed.

The steps 611 for determining a plurality of control vectors for the block, the sub-division 612 of the block into sub-blocks, the determining 613 of a plurality of control vectors for the sub-blocks and the determining 614 of a value of prediction for at least one pixel of the image to be reconstructed are similar to those implemented during the encoding and are therefore not described here in greater detail.

In particular, it may be noted that this step 611 for determining a plurality of control vectors $vb_C$ for the block $b_C$ takes account of the information on reconstruction obtained during the step 62.

According to a first variant, these pieces of information on reconstruction especially take the form of at least one connection flag inserted into the signal representing the image sequence at the encoder. For example, these pieces of reconstruction information include flag_tc and flag_lc.

According to a second variant, these pieces of information on reconstruction take the form of the control vectors for the block $b_C$, directly transmitted in the stream.

6. Inversion of Motion

As indicated here above, the technique proposed enables the encoding/decoding of the sequence of images in using forward and/or backward projections.

Thus, the motion defined on the blocks may be inverted and may enable the making of a process of encoding/decoding by forward projection (the motion vectors are defined on a reference image), pieces of information (prediction in the current image of the textural values of motion or of all other useful information such as for example a piece of information on depth for a 3D video encoder encoding information on depth.

The image reconstructed by motion inversion is obtained by means of the sub-division into sub-blocks described here above. This reconstructed image can be used in the encoder and/or in the decoder.

7. Structures of the Encoder and of the Decoder

Figure 7:
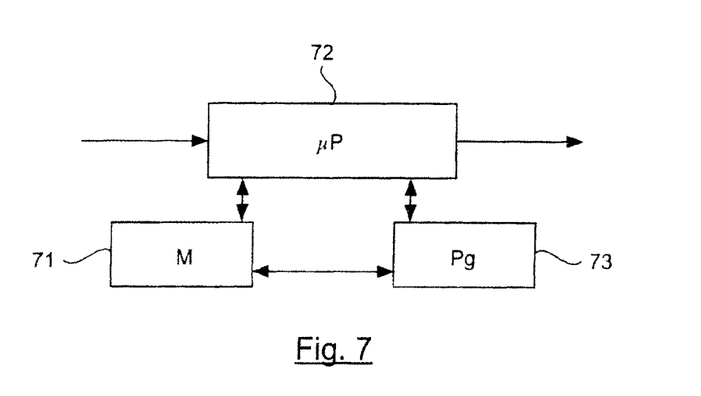
FIGS. 7 and 8 present the structure of an encoding device and a decoding device according to one particular embodiment of the invention.
Figure 8:
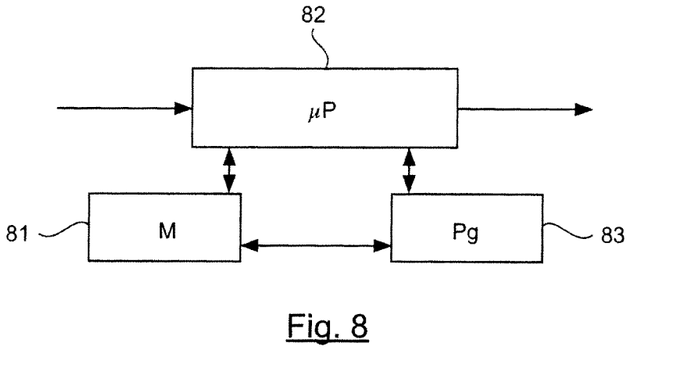

Referring now to FIGS. 7 and 8, we finally present the simplified structures of an encoding device and a decoding device implementing respectively a technique of encoding and a technique of decoding as described here above.

An encoding device as illustrated in FIG. 7 comprises a memory 71 comprising a buffer memory, a processing unit 72, equipped for example with a microprocessor µP and driven by the computer program 73 implementing the encoding method according to an embodiment of the invention.

At initialization, the computer program code instructions 73 are for example loaded into a RAM and then executed by the processor of the processing unit 72. The processing unit 72 receives at input at least one image to be encoded or a block of an image to be encoded. The microprocessor of the processing unit 72 implements the steps of the encoding method described here above according to the instructions of the computer program 73 to determine a prediction of the image or of the block to be encoded and to encode the block or the corresponding image. To this end, the encoding device comprises, in addition to the buffer memory 71, prediction means associating the block with at least one corresponding block in a reference image of the sequence and means for inserting, in a signal representing the sequence, information on reconstruction of the control vectors for the block, the prediction means comprising means for determining a plurality of control vectors for the block, means for sub-dividing the block into sub-blocks, means for determining a plurality of control vectors for the sub-blocks and means for determining a prediction value for at least one pixel of the current image. These means are driven by the microprocessor of the processing unit 72.

An decoding device as illustrated in FIG. 8 comprises a memory 81 comprising a buffer memory, a processing unit 82, equipped for example with a microprocessor µP and driven by the computer program 83 implementing the encoding method according to an embodiment of the invention.

At initialization, the computer program code instructions 83 are for example loaded into a RAM and then executed by the processor of the processing unit 82. The processing unit 82 receives at input a signal representing a sequence of images comprising pieces of information for the reconstruction of the control vectors associated with at least one given block. The microprocessor of the control unit 82 implements the steps of the decoding method described here above according to the instructions of the computer program 83 to determine a prediction of the given block, and reconstruct the corresponding image. To this end, the decoding device comprises, in addition to the buffer memory 81, means of reconstruction of at least one image of said sequence and means for obtaining information on reconstruction of control vectors for at least one given block, the means of reconstruction comprising prediction means comprising means for determining a plurality of control vectors for the block, means for sub-dividing into sub-blocks and means for determining a plurality of control vectors for the sub-block, means for determining a prediction value for at least one pixel of the image to be reconstructed. These means are driven by the microprocessor of the processing unit 82.

Although the present disclosure has been described with reference to one or more examples, workers skilled in the art will recognize that changes may be made in form and detail without departing from the scope of the disclosure and/or the appended claims.

The invention claimed is:

1. A method for encoding a sequence of images, comprising:
encoding at least one block of a current image of the sequence, implementing a prediction associating said block with at least one corresponding block in a reference image of said sequence, wherein said prediction comprises the following steps performed by an encoding device for at least one given block of the current image or of the reference image respectively:
determining a plurality of control vectors for said block, each of said control vectors representing a shift between a characteristic point of said block and a corresponding position of said characteristic point in the reference image or in the current image respectively, and each of said control vectors being determined by taking into account a motion vector of said block and at least one connection flag representing a motion between the given block and at least one neighboring block in said reference and current images, a value of said connection flag representing a common ridge both in the current and in the reference image between said given block and said at least one neighboring block;
subdividing said block into sub-blocks at least once;
determining a plurality of control vectors for said sub-blocks from the control vectors for said block; and
determining a value of prediction for at least one point of said current image, from a motion compensation of at least one of said sub-blocks, performed from the control vectors determined for said sub-block; and
inserting said motion vector and information for reconstructing said control vectors for said given block into a signal representing said sequence, said information for reconstructing said control vectors including the at least one connection flag representing a motion between said given block and said at least one neighboring block.

2. The method for encoding according to claim 1, wherein said at least one connection flag comprises:
   a first flag representing a motion between said given block and the block situated above said given block, between the current image and the reference image, and
   a second flag representing a motion between said given block and the block situated to the left of said given block, between the current image and the reference image.

3. The method for encoding according to claim 1, wherein said control vectors for said block or sub-block are each associated with a vertex of said block or sub-block.

4. A non-transitory computer readable medium comprising program code instructions for implementing a method of encoding a sequence of images, when the instructions are executed on a computer, wherein the method comprises:
   encoding at least one block of a current image of the sequence, implementing a prediction associating said block with at least one corresponding block in a reference image of said sequence, wherein said prediction comprises for at least one given block of the current image or of the reference image respectively:
      determining a plurality of control vectors for said block, each of said control vectors representing a shift between a characteristic point of said block and a corresponding position of said characteristic point in the reference image or in the current image respectively, and each of said control vectors being determined by taking into account a motion vector of said block and at least one connection flag representing a motion between the given block and at least one neighboring block in said reference and current images, a value of said connection flag representing a common ridge both in the current and in the reference image between said given block and said at least one neighboring block;
      subdividing said block into sub-blocks at least once;
      determining a plurality of control vectors for said sub-blocks from the control vectors for said block; and
      determining a value of prediction for at least one point of said current image, from a motion compensation of at least one of said sub-blocks, performed from the control vectors determined for said sub-block; and
   inserting said motion vector and information for reconstructing said control vectors for said given block into a signal representing said sequence, said information for reconstructing said control vectors including the at least one connection flag representing a motion between said given block and said at least one neighboring block.

5. A device for encoding a sequence of images, comprising:
   means for encoding at least one block of a current image of the sequence, implementing prediction means for associating said block with at least one corresponding block in a reference image of the sequence, wherein said prediction means comprise, for at least one given block of the current image or of the reference image respectively:
      means for determining a plurality of control vectors for said block, each of said control vectors representing a shift between a characteristic point of said block and a corresponding position of said characteristic point in the reference image or in the current image respectively, and each of said control vectors being determined by taking into account a motion vector of said block and at least one connection flag representing a motion between the given block and at least one neighboring block in said reference and current images, a value of said connection flag representing a common ridge both in the current and in the reference image between said given block and said at least one neighboring block;
      means for subdividing said block into sub-blocks;
      means for determining a plurality of control vectors for said sub-blocks from the control vectors for said block; and
      means for determining a value of prediction for at least one point of said current image, from a motion compensation of at least one of said sub-blocks, performed from the control vectors determined for said sub-block; and
   means for inserting into a signal representing said motion vector and said sequence information for reconstructing said control vectors for said given block, said information for reconstructing said control vectors including the at least one connection flag representing a motion between said given block and said at least one neighboring block.

6. A method for decoding a signal representing a sequence of images, the method comprising:
   reconstructing at least one image of said sequence, from a prediction of the image to be reconstructed, said prediction associating a block of the image to be reconstructed with at least one corresponding block in a reference image of said sequence, wherein reconstructing is performed with a decoding device and comprises obtaining information for reconstructing control vectors for at least one given block of the image to be reconstructed or of the reference image respectively, said information for reconstructing said control vectors including at least one connection flag representing a motion between said given block and at least one neighboring block; and
   wherein said prediction includes, for said given block:
      determining a plurality of control vectors for said block, each of said control vectors representing a shift between a characteristic point of said block and the corresponding position of said characteristic point in the reference image or in the image to be reconstructed respectively, from said information for reconstructing control vectors, and each of said control vectors being determined by taking into account a motion vector of said block and said at least one connection flag representing a motion between the given block and said at least one neighboring block in said reference and current images, a value of said connection flag representing a common ridge both in the current and in the reference image between said given block and said at least one neighboring block;
      subdividing the block into sub-blocks at least once;
      determining a plurality of control vectors for said sub-blocks from the control vectors for said block; and
      determining a value of prediction for at least one point of the image to be reconstructed from a motion compensation of at least one of said sub-blocks, performed from the control vectors determined for the sub-block.

7. The method for decoding according to claim 6, wherein obtaining information includes extracting the at least one connection flag representing a motion between the given block and at least one neighboring block.

8. The method for decoding according to claim 6, wherein obtaining information includes receiving said control vectors for said given block.

9. The method for decoding according to claim 6, wherein the method comprises determining and/or parametrizing said subdividing, according to a predetermined criterion belonging to the group comprising:
- a predetermined number of sub-blocks for the block;
- a piece of information on similitude between said control vectors;
- a size of said block;
- an flag representing a subdivision number.

10. A non-transitory computer readable medium comprising program code instructions for implementing a method of decoding a signal representing a sequence of images, when the instructions are executed by a processor, wherein the method comprises:
- reconstructing at least one image of said sequence, from a prediction of the image to be reconstructed, said prediction associating a block of the image to be reconstructed with at least one corresponding block in a reference image of said sequence, wherein reconstructing comprises obtaining information for reconstructing control vectors for at least one given block of the image to be reconstructed or of the reference image respectively, said information for reconstructing said control vectors including at least one connection flag representing a motion between said given block and at least one neighboring block; and
- wherein said prediction includes, for said given block:
  - determining a plurality of control vectors for said block, each of said control vectors representing a shift between a characteristic point of said block and the corresponding position of said characteristic point in the reference image or in the image to be reconstructed respectively, from said information for reconstructing control vectors, and each of said control vectors being determined by taking into account a motion vector of said block and said at least one connection flag representing a motion between the given block and said at least one neighboring block in said reference and current images, a value of said connection flag representing a common ridge both in the current and in the reference image between said given block and said at least one neighboring block;
  - subdividing the block into sub-blocks at least once;
  - determining a plurality of control vectors for said sub-blocks from the control vectors for said block; and
  - determining a value of prediction for at least one point of the image to be reconstructed from a motion compensation of at least one of said sub-blocks, performed from the control vectors determined for the sub-block.

11. A device for decoding a signal representing a sequence of images, comprising:
- means for reconstructing at least one image of said sequence, implementing means for predicting the image to be reconstructed, said means for predicting associating a block of the image to be reconstructed with at least one corresponding block in a reference image of said sequence, wherein the means for reconstructing comprises means for obtaining information for reconstructing control vectors for at least one given block of the image to be reconstructed or of the reference image respectively, said information for reconstructing said control vectors including at least one connection flag representing a motion between said given block and at least one neighboring block, and wherein the means for predicting include, for the given block:
  - means for determining a plurality of control vectors for said block, each of said control vectors representing a shift between a characteristic point of the block and a corresponding position of said characteristic point in the reference image or in the image to be reconstructed respectively, from information for reconstructing control vectors, and each of said control vectors being determined by taking into account a motion vector of said block and said at least one connection flag representing a motion between the given block and said at least one neighboring block in said reference and current images, a value of said connection flag representing a common ridge both in the current and in the reference image between said given block and said at least one neighboring block;
  - means for subdividing said block into sub-blocks;
  - means for determining a plurality of control vectors for said sub-blocks from the control vectors for said block; and
  - means for determining a value of prediction for at least one point of the image to be reconstructed, from a motion compensation of at least one of said sub-blocks, performed from the control vectors determined for said sub-block.

* * * * *